Figure 1:
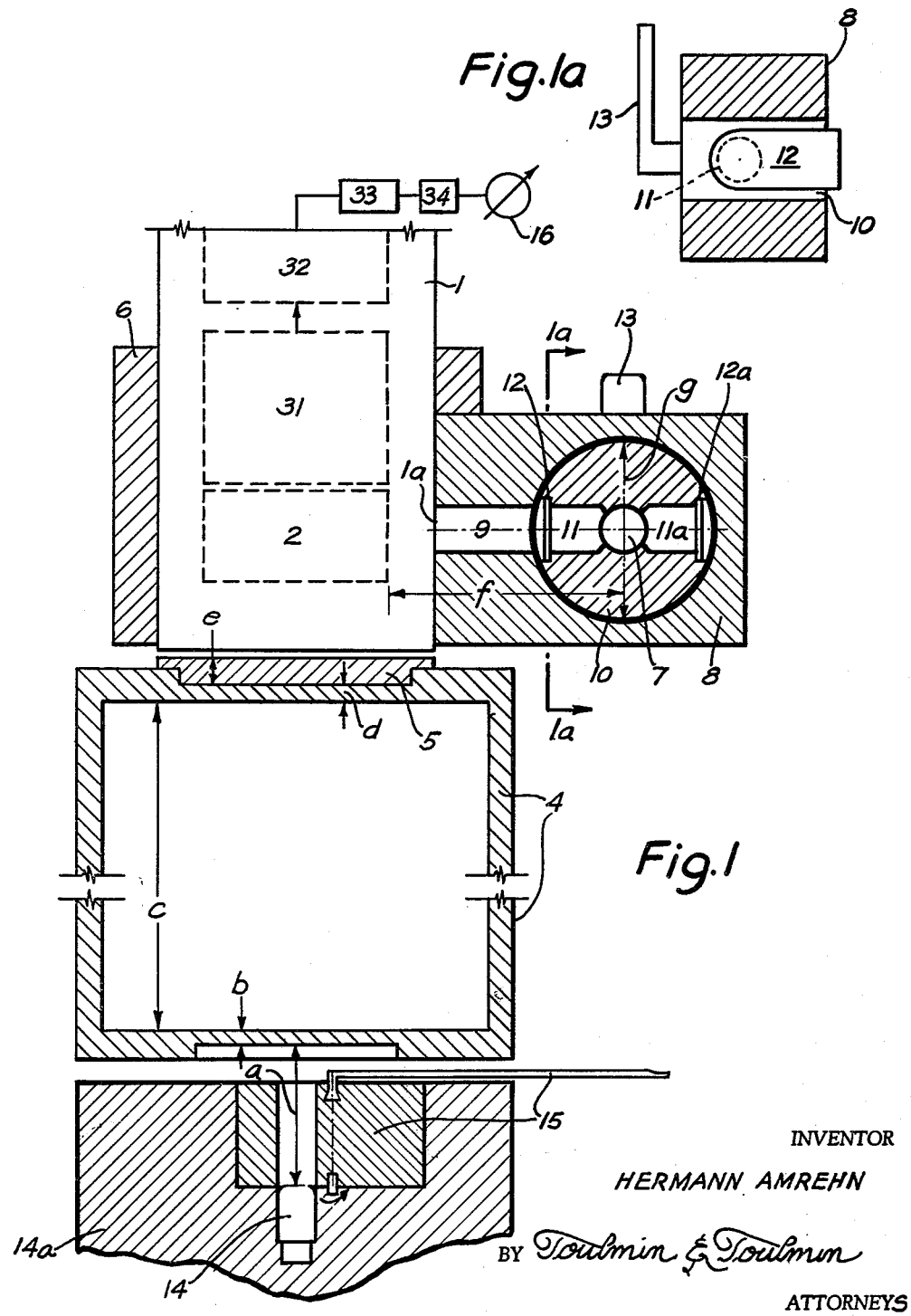

May 11, 1965

H. AMREHN 3,183,354

CALIBRATOR FOR GAMMA RAY DENSITY MEASURING
APPARATUS INCLUDING SETS OF ABSORBER
PLATES INSERTABLE IN THE PATH
OF RADIATION

Filed July 3, 1962

2 Sheets-Sheet 1

INVENTOR
HERMANN AMREHN
BY Toulmin & Toulmin
ATTORNEYS

May 11, 1965    H. AMREHN    3,183,354
CALIBRATOR FOR GAMMA RAY DENSITY MEASURING
APPARATUS INCLUDING SETS OF ABSORBER
PLATES INSERTABLE IN THE PATH
OF RADIATION
Filed July 3, 1962    2 Sheets-Sheet 2

INVENTOR

HERMANN AMREHN

BY Toulmin & Toulmin

ATTORNEYS

United States Patent Office 3,183,354
Patented May 11, 1965

3,183,354
CALIBRATOR FOR GAMMA RAY DENSITY MEASURING APPARATUS INCLUDING SETS OF ABSORBER PLATES INSERTABLE IN THE PATH OF RADIATION
Hermann Amrehn, Marl, Germany, assignor to Chemische Werke Hüls, A.G., Marl, Kreis Recklinghausen, Germany
Filed July 3, 1962, Ser. No. 207,309
Claims priority, application Germany, July 12, 1961, C 24,596
4 Claims. (Cl. 250—71.5)

The present invention relates to a device for calibrating a fluid density measuring apparatus operating with gamma rays for probing.

In general, liquid density measuring apparatus having a probing gamma ray comprising a container of liquid, a gamma-ray source such as Cobalt 60 or Cesium 137, a ray path through the liquid, a radiation detector such as scintillation counter, and an electronic amplifier connected to the detector. The radiation source is positioned in a lead container for reasons of safety protection, which container has a "window" adjacent the liquid container. The container serves as a gamma ray screen so that the radiation dose appearing outside thereof is so small that it does not endanger the personnel. A device of this kind is, for example, described in Archiv für technisches Messen, vol. 265, 1958, pages 25–26.

The calibration of this known apparatus includes the employment of calibration solutions of very accurately determined densities; the liquid container is alternatingly filled with these liquids and then the electric measuring instrument connected to the scintillometer-detector is calibrated by zero displacement and gain adjustment of the amplifier interposed between scintillometer and instrument. By this way the instrument pointer is made to assume one terminal position when the liquid measuring container is charged with one of the calibration liquids, and the other terminal position when the liquid container is charged with the other calibration liquid. Hence, the instrument is calibrated for the detection of density variations of a measuring liquid occurring between values similar to the values of the calibration liquids as respective maximum and minimum.

In case of recalibration to a different density range, other calibration liquids representing such other range as maximum and minimum thereof have to be employed. Thus, for universal use, a large stock of calibration liquids is required.

It is a primary object of the invention to provide a new and improved calibration method and apparatus for density measuring apparatus with gamma rays, overcoming the deficiencies of the prior art.

It is another object of the present invention to provide a calibrator unit for a density measuring apparatus with gamma rays which unit can be used as attachment to such apparatus, either as detachable, auxiliary unit or in permanent connection therewith.

It is a further object of the present invention to provide for the calibration of a density measuring apparatus without employing any calibration liquid.

It is still a further object of the present invention to provide for a calibration device for a density measuring apparatus with gamma rays in which the output amplifier of the radiation detector is readjusted for one range of density variations, while attachment absorbers are employed to shift the zero point of the detector-amplifier.

It is still a further object to provide a density measuring apparatus with gamma rays with a calibration attachment including sets of absorber plates with which recalibration and readjustment can be carried out covering a wide range of possible densities to be detected.

According to one aspect of the present invention in a preferred embodiment thereof, it is suggested that a density measuring apparatus be equipped as follows:

A density measuring apparatus of the type involved usually includes a liquid container and a gamma ray source; a scintillation crystal is disposed so as to be responsive to those gamma rays from the source which have passed through the liquid. The crystal is housed in a light proof container having a sidewardly directed window aside from the window directed towards the gamma ray source. These windows are not light transparent, but they are sufficiently thin not to attenuate too much of the gamma rays to be detected. The lateral "window" communicates with a casing housing the actual calibrator unit. The casing has a bore terminating with one of its ends at the lateral window and terminating with its other end in a cylindrically shaped cavity having its axis positioned perpendicularly to the axis of that bore. The cylindrical cavity receives a matching, cylindrical capsule made of lead and being rotatable about its axis. There are two bores or windows in the capsule, individually alignable with the bore of the casing upon rotation of the capsule. At the center of the capsule there is a second gamma ray source communicating with both the capsule windows. Finally, there are provided receiving means for receiving calibration plates and positioning them across the capsule windows to attenuate the gamma rays from the second source at predetermined but different degrees. The capsule, furthermore, is devised so as to block any radiation from this second source off the scintillation crystal, when in a position in which none of the capsule windows registers with the bore of the casing.

A further feature of the invention is the provision of a selectable calibrator plate to be positioned in front of the crystal and in the ray path from the first gamma ray source.

Figure 2:
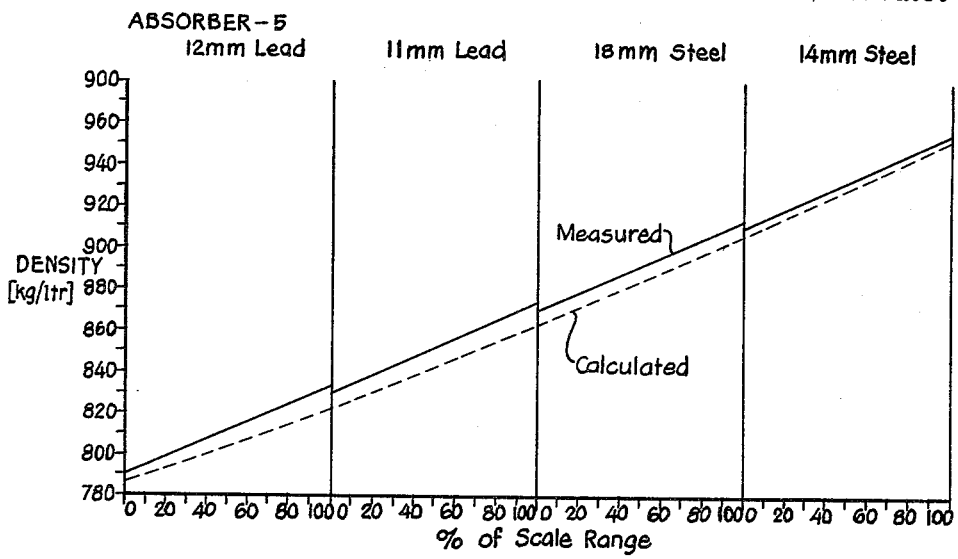
Figure 3:
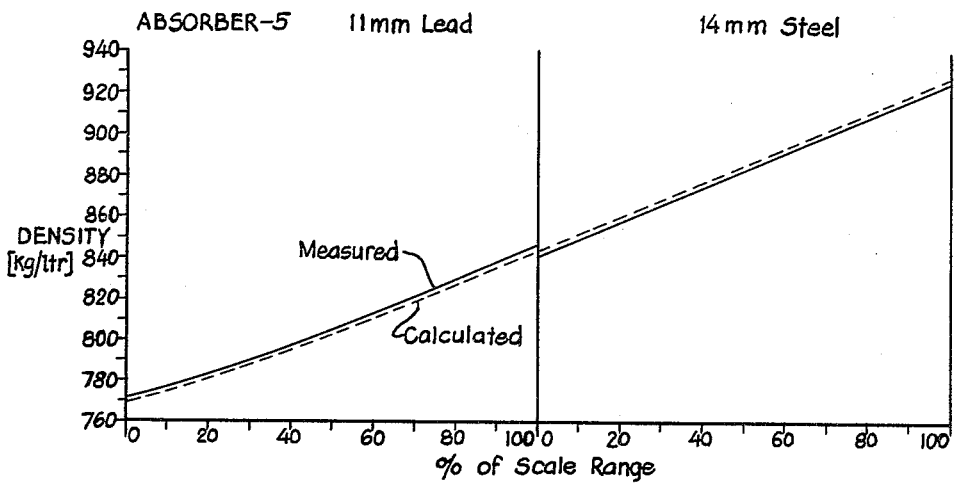

While the specification concludes with claims particularly pointing out and distinctly claiming the subject matter which is regarded as the invention, it is believed that the invention, the objects and features of the invention and further objects, features and advantages thereof, will be better understood from the following description taking in connection with the accompanying drawing in which:

FIG. 1 illustrates a cross sectional view of a liquid density measuring device with calibrator attachment in accordance with the invention. FIG. 1a illustrates a cross sectional view through the calibrator attachment along lines I—I of FIG. 1, and FIGS. 2 and 3 are diagrams of plotted curves comparing the effect of different calibrator plates in the device illustrated in FIG. 1.

Description of the apparatus

In FIG. 1 there is shown a measuring tube 4 containing a liquid during normal operation, and the density of this liquid is to be detected. This tube 4 may be equipped in a conventional manner with inlets and outlet so as to enable continuous measurement, while liquid is continuously charged into and discharged from this measuring tube 4.

Adjacent the lower portion of tube 4 there is disposed a radioactive source 14 of gamma rays in a lead container 14a, the radiation of which is permitted to pass into tube 4 during density measurements, while a rotatable lead shutter element 15 is capable of closing the tube 4 off from this gamma radiation.

On top of tube 4 is disposed either by loosely seating or by detachably securing, or even completely separately supported, an opaque tube 1 housing a scintillation crystal 2. This crystal 2 faces the thinned top of tube 4 providing an exit window for the gamma rays from source 14. The thinned top of tube 4 defines a recess receiving an exchangeable gamma radiation absorber 5 which thus is placed between the top of tube 4 and housing 1.

Crystal 2 is light-conductively coupled with a photo-multiplier 31 and a pre-amplifier 32 and producing output pulses in accordance with the gamma-quanta received in crystal 2.

As schematically indicated, multiplier 31 and preamplifier 32 are electrically connected to a main-amplifier 33 feeding its output to an integrator unit 34 connectable to an electrical indicating instrument 16.

The individual pulses of multiplier 31 represent the input for integrator unit 34 which is also conventional and is usually comprised of a capacitor and a shunted resistor whereby the average charge across the capacitor determines the pulse rate. Since, in this case, one is not interested in any energy distribution and since the amplitude of the pulses from multiplier 31 are proportional to the quantum energy, a clipper is preferably interposed between multiplier 31 and integrator 34. The output of pre-amplifier 32 to amplified in A.C. amplifier 33 which is of conventional design and is provided with adjustable zero-bias and adjustable gain control. Thus, amplifier 33 can be adjusted to produce output zero at a particular pulse rate, and the gain is adjustable to suit the particular instrument to be connected thereto.

The instrument 16 is a non-calibrated meter operating as rate meter and responding to the electrical output signal produced by integrator 34. The instrument 16 converts such output into a pointer deflection.

The purpose of the invention is to calibrate this instrument 16 in units of density variations.

The absorber 5 in the top recess of tube 4 has such an overall diameter that substantially all of the radiation from source 14 and reaching crystal 2 has passed through this absorber plate 5. There is a silicon grease layer interposed between absorber 5 and tube 4 and absorber 5 and tube 1 to prevent moisture from entering the gamma-ray path as defined between crystal 2 and source 14.

The opaque housing 1 is partially covered by a lead sleeve 6 so as to protect crystal 2 from scattered radiation from source 14. Sleeve 6 has a sidewardly projecting lead casing 8 having a bore 9 and communicating with a cylindrical cavity receiving a rotatable capsule 10. This capsule 10 is also cylindrical and has an axis of rotation coinciding with the center axis of the cavity and extending perpendicular to the plane of the drawing. A radioactive calibration substance 7, for example CS–137, when source 14 is also CS–137 is positioned in the center of capsule 10. Capsule 10 has two radiation windows 11 and 11a provided in mutually aligned relationship and capable of individually registering with bore 9.

Absorber plate 12 and 12a are respectively disposed in front of each window and in respective matching recesses of capsule 10. These plates are exchangeably disposed, and they govern the radiation permitted to enter bore 9 from source 7.

A handle 13 is provided to rotate capsule 10 inside of casing 8 so as to selectively place either window 11 or 11a in alignment with bore 9, or to close bore 9 off by means of the lead material forming capsule 10. Preferably handle 13 can be arrested in a conventional manner in positions angularly displaced by 90 degrees.

In the following the designation: calibration position I, is to indicate the position of capsule 10 as illsutrated. Calibration position II is to indicate a position differing from position I by a rotation by 180 degrees, so that window 11a registers with bore 9. Any position differing by 90 degrees from any of the two calibration positions is to be called resting position.

Since calibration of the measuring apparatus depends largely on the specific dimensions thereof, the calibration will best be described on the basis of a specific design for the entire measuring apparatus. There is, for example, a radiation source 14 comprising CS–137 at an activity of 500 mc. The source 14 has a distance $a=100$ mm. from the bottom of tube 4 which distance includes the passage through open window 15, and a diameter of 10 mm., it being of circular shape. The radiation entrance window of tube 4 at the bottom thereof has a thickness of $b=3$ mm.

The distance $c$ measures the radiation path through the fluid in tube 4, having a value of, for example, $c=630$ mm.

The top of tube 4 at the recess thereof, has a thickness of $d=3$ mm. thus constituting the exit window of measuring tube 4.

Absorber plate 5 may have a thickness of $e=10$ mm. and a diameter of 65 mm. in the recess, and 75 mm. of the upper portion. As calibration radioactive source 7, also CS–137 is to be used, but exhibiting only an intensity of 0.4 mc. This source 7 has a distance $f=130$ mm. from the scintillation crystal 2.

Bore 9 and windows 11 and 11a have a similar diameter of 10 mm. The substance 7 itself has a diameter of 9 mm. and capsule 10 has a diameter $g=80$ mm. Furthermore, tube 1 is also made of stainless steel and has a wall thickness of 1 mm. Crystal 2 is composed of NaI(Tl) and has a diameter of 40 mm. at a height of 20 mm.

With the exception of the thickness of plate 5, these are the invariable dimensions of an apparatus as suggested to be used for density measurements of different fluids, particularly liquids and in connection of which the calibration procedure is explained in detail in the following.

The variable elements for calibration are: The plate 5 (thickness $e$) plate 12 (thickness $h$) and plate 12a (thickness $k$).

*Preparation for calibration*

The apparatus is, for example, to be prepared for measuring the variable density of a liquid-mixture which may include 100% water or less. Thus, the maximum density to be expected is 1 g./cm.$^3$. It may further be assumed, or, it may be known, that no lesser density than 0.95 g./cm.$^3$ is to be expected. Accordingly, the apparatus is to be calibrated for a density range of 50 g./ltr., at a maximum density of 1 g./cm.$^3$.

Prior to the actual calibration, the expected output at amplifier 33 has to be estimated and approximated; more important, however, the plates 5, 12 and 12a have to be accurately determined. It will become more apparent later in this specification, that the actual calibration is carried out with a particular combination of plates 5–12–12a. For this purpose, instrument 16 is disconnected and an exact counting rate meter (master rate meter) is connected to amplifier 33. This counter responds to *all* pulses detected by crystals 2, pre-amplifier 32 and amplifier 33 and this master rate meter is strictly calibrated in pulse units per second. As far as the measuring apparatus itself is concerned, the only variable therein (aside of course from the liquid) is plate 5, particularly the selectable thickness thereof. During measurement i.e. after calibration, plate 5 will remain in position and is not exchanged, while plates 12 and 12a are employed only for and during calibration. Thus, prior to operation and prior to calibration, a suitable thickness and material for plate 5 has to be determined. Suitable in this connection means that absorber plate 5 is to balance the total absorbtion including that of a given measuring liquid so as to place the entire electronic equipment into its best operating range.

Since one has to expect during a measurement, for example, occurrence of a density of 1 g./cm.$^3$ as stated, the tube 4 will be filled with pure water. In other words 1 g./cm.$^3$ is a density reasonably expected for later use. Thus, in order to determine plate or plates 5, one can use simply water as a liquid for determining the variables of the apparatus. It should be mentioned and repeated at this stage that calibration of the apparatus in accordance with the invention does not require any calibration liquid;

moreover, even for the preparation of the apparatus for purpose of calibration one does not need any special calibration liquids but only pure water, this water, however, preferably is at +4° C. so as to have the true density of 1 g./cm.³.

Proceeding now with the preparation, at first no plate 5 is inserted, and then the master counting-rate meter is connected to amplifier 33 as stated. The calibrator is placed in resting position (refined supra) and window 15 is opened, so that radiation from source 14 can reach crystal 2. Then the counting rate is measured and plotted. Thereafter an arbitrarily selected plate 5 is placed into the top recess of tube 4, for example, a plate of stainless steel having a thickness of 10 mm., and then another counting rate value is obtained from and with the master counting rate meter.

This first preliminary measurement determines two facts. Since there is a functional relationship of the absorption or attenuation dependent upon the thickness of the material employed, the two measured rate values follow a ratio of $1:e^{-\mu e}$, with $e$ being the thickness of the plate, here 10 mm. as defined above. Since no other change was made in the apparatus aside from first omitting plate 5—10 mm. and then placing it into the measuring path, one can determine accurately the attenuation coefficient $\mu$ for the particular rays from this particular source 14 in this particular material, here stainless steel. Having done this, one can determine and calculate desired attenuation rates of plates such as 5 made of the same material but of different thickness. This will be more fully explained below.

For the moment, it is important that as the second result of this preliminary test, one has also determined a particular counting rate value for water at density 1 g./cm.³ and with a plate 5 of stainless steel—10 mm. thickness. With the particular apparatus described in the previous chapter, a rate value of 3200 pulses/sec. was detected. This value through arbitrarily selected shall be used as basic value for the calibration.

Since one has in this connection started with an arbitrarily selected plate 5 it should be mentioned however, that it is assumed that with or without such plate the observed and measured pulse rates were within the, or a linear range of the, transfer characteristics, taken from input of crystal 2 to output of amplifier 33 and 34. If it were not, it is necessary, preferably by trial and error, to find such plate 5 and eventually two thereof, placing the operation into such linear branch. With the apparatus described, plate 5—10 mm. and a pulse rate of 3200 pulses/sec. indeed comply to this requirement.

Having selected this particular value 3200 pulses/sec., two further preliminary operating conditions are determined therewith. First, for the calibrated apparatus with regard to a particular range of densities, this particular value of 3200 pulses/sec. is to determine the zero (or unity) marker of the indicating instrument 16. In other words, for the later calibration, any adjustment of the measuring device as a whole, will be carried out so that at 3200 pulses/sec. the pointer of instrument 16 is in one terminal position. Secondly, the apparatus with accessories has to be modified in case of a density range change so that one can always reproduce 3200 pulses/sec. as basic value even if a different type liquid is to be measured. For this purpose one simply will place a different but predetermined absorber plate 5 in the top recess of tube 4, without having to resort again to the master counter so as to verify this value of 3200 pulses/sec. These particulars will become apparent below, but it will be appreciated why such basic or reference value such as 3200 pulses/sec. is necessary to be determined during precalibration procedue.

Summarizing, one has now determined that with a plate 5—10 mm., a counting rate of 3200 pulses/sec. is produced for a water density of unity; accordingly one has determined the expected pulse rate for one marginal density value and for one particular absorber plate 5.

*Adjusting of the calibrator*

Since the attenuation of the gamma radiation in water or a watery solution is inversely proportional to the density thereof, one can write the following equation:

$$\frac{3200 \text{ pulses/sec.}}{\text{pulse rate at 5\% less density}} = \frac{e^{-p}}{e^{\frac{-p}{0.95}}}$$

$p$ is the overall attenuation of the tube 4 with plate 5—10 mm. and filled with water of unity density and can be determined in simply measuring the counting rate with and without tube 4. The equation given above determines a pulse rate of 3900 pulses/sec. for a watery liquid of 0.95 g./cm.³. Since this is the first density range of interest one knows now that at a rate of 3900 pulses/sec. the instrument 16 when connected is to have the other terminal position. Thus, with a density range of 1 to 0.95 g./cm.³ the pulse rate varies from 3200 pulses/sec. to 3900 pulses/sec. or, in other words, a range of 50 g./ltr. is covered by a pulse range of 700 pulses/sec. and the instrument 16 is to cover with its entire indicating range this particular range during operating measurement. This is obtained still at one plate 5 of 10 mm. thickness. The purpose of using other plates 5 of different thickness will be explained below.

At this point, one knows now that 3200 pulses/sec. and 3900 pulses/sec. are the margin values of the intended measurement, to which instrument 16 (not yet connected) is to be calibrated; the value 3200 was obtained by direct measurement for this.

The purpose of the invention is to provide for a proper calibration for density measurement without requiring the presence of calibration liquids *known* to have different densities. In other words, the device is to be calibrated for the calibration liquids of two known and different densities.

In the previous paragraphs, the variable of the measuring apparatus itself, plate 5, was determined and this plate 5 in turn, determined the expected output range of/or for amplifier 33. Now the variables of the calibrator itself have to be determined, which are the plates 12 and 12a.

This can be done by calculation, but better by direct measurement as follows: Window 15 is closed, so that no radiation of the source 14 can reach crystal 2. Then, for example, by placing capsule 10 in one of the calibrating positions, an arbitrarily or approximately correct plate 12′ is inserted in the appropriate place illustrated. Again the master counting rate meter is connected to integrator 32. If plate 12′, as inserted, has a thickness X, and is made of the same material previously used for plate 5, one then knows the fact $e^{-x\mu}$. If Y is the pulse rate then determined by the master rate meter, one will find the two desired plate thickness's as follows:

The plate 12 (thickness $h$)

$$\frac{3200}{Y} = \frac{e^{-\mu h}}{e^{-\mu x}}$$

out of which $h$ can be calculated ($h = 8.5$ mm.)

Plate 12a (thickness $k$)

$$\frac{3900}{Y} = \frac{e^{-\mu k}}{e^{-\mu x}}$$

out of which $k$ can be calculated ($k = 7.0$ mm.)

Having then made two calibrator plates of respective thickness $h$ and $k$ (approx.), one then preferably will place these plates 12 and 12a into proper position and by fine grinding one will give them the thickness so that exactly 3200 and 3900 pulses/sec. are respectively observed with the still connected master counting rate meter.

Summary of preliminaries

It will be appreciated that in the foregoing it was described how particular elements for plates 5, 12 and 12a are obtained with the aid of a master counting rate meter. For the actual calibration these elements 5, 12 and 12a are then already in existence and for use of the device and the actual calibration, no master counting meter is necessary.

The apparatus as now in existence (without the master rate meter) has an inherent property, that, upon placement of plate 5 (10 mm.) into its proper place and filling the tube 4 with water (density unity) one will obtain 3200 pulses/sec., i.e. whatever electrical output appears at amplifier 33, represents 3200 pulses/sec. One also knows that with closing of window 15 and placing plate 12 into its proper place and turning capsule 10 to calibration position (I) the same output appears at amplifier 33. Provided the preliminaries were carried out with appropriate accuracy, if one places plate 12a into calibration position II, 3900 pulses/sec. appear at multiplier 31, and they are represented by whatever electrical output then may appear at the output terminals of amplifier 33.

It should be mentioned that one can prepare a complete set of plates 12, 12a each one being associated with a particular rate value. It will also be appreciated that one can prepare a set of plates 5 of different thicknesses, with the aid of the master counting rate meter, each one associated with a particular liquid density-rate value combination. But for the calibration to be explained in the following, only one plate each for 5, 12, 12a is needed, which was given above as:

$$5—e=10 \text{ mm.}$$
$$12—h=8.5 \text{ mm.}$$
$$12a—k=7 \text{ mm.}$$

Calibration

Window 15 is to be closed and it does not matter whether tube 4 contains any liquid.

Capsule 10 is placed into calibrating position I, instrument 16 is connected to integrator 34. Now the zero displacement of amplifier 33 or integrator 34 is shifted until the pointer of instrument 16 registers with the zero marker thereof.

Next, the capsule 10 is placed into calibration position II and the amplification or gain of amplifier 33 is adjusted until the pointer of instrument 16 is just in its maximum indicating position.

Now capsule 10 is placed in one of the resting positions and the apparatus is ready for an operation in which:

(1) A watery solution having a density between 0.95 and 1 g./cm.$^3$ may pass through the tube 4, and (2) The entire range of 50 g./cm.$^3$ as possible density variations is covered by the entire indicating range of instrument 16.

One can, for example, superimpose upon the instrument i.e. adjacent the pointer range, a scale appropriately divided into units from 0 to 50 or from 1,000 to 0.950 as desired. The marker or unit distances follow a strictly logarithmical rule.

It will be appreciated that for the calibration itself, the pulse rate does not have to be known. More particularly, the user of the device including the calibrator described above, and the set of plates 5–12–12a does not have to know these particulars. The calibrating device is attached to the actual radiation detector and preferably remains in fixed relationship thereto, or, at least, it is detachable in such a manner that the calibrating positions can accurately be reproduced. Whenever there is a need for recalibration, simply window 15 is closed and the calibrator is brought into the positions I and II while the zero point and the amplification or gain of the amplifier is readjusted. This may, for example, be necessary due to aging of the multiplier, amplifier bias drift or the like. Also, the radioactive substances reduce their activity so that every month or so, recalibration is necessary. If one uses similar substances for calibration and measuring (i.e. for example CS–137 for both, source 14 and source 7) recalibration is carried out by placing the calibrator capsule 10 into the two calibrating positions I and II and by adjusting the amplification and zero point of the amplifier; this readies the measuring apparatus again, particularly instrument 16 so as to indicate zero at density 1 g./cm.$^3$ and maximum at density by 0.95 g./cm.$^3$.

Alteration of measuring range

From the foregoing it will be appreciated that the user of the apparatus, when intending to use it, does not need to know whatever the amplifier 33 is presently adjusted and what kind of liquid was used and measured previously. When he wants to measure and supervise a watery solution expected to have a density range of 0.95–1.00 g./cm.$^3$ he simply places the plates 5—10 mm., 12—8.5 mm., 12a—7.0 mm. into their proper position and recalibrates as described above under "calibration," and the device is ready again for density measurement.

Thus, it will be understood that the apparatus can be calibrated to any range simply by suitably selecting plate combinations 5–12–12a. It will be remembered that plate 12—8.5 mm. was used in order to have a radiation of 3200 pulses/sec. observed at the crystal 2. Leaving this one value always as determining scale value zero for instrument 16, plate 12 will always be the same, so that for range variations only a set of various plates 5 and of plates 12a is needed. This simplifies the calibrator arrangement and its adaption to several density ranges, but is not essential.

Plate 5—10 mm. influenced the total attenuation of the gamma radiation so that at a liquid density of 1 g./cm.$^3$ there was observed a rate of 3200 pulses/sec. Even if the calibrator does not know this figure, he knows that the density range covered with that plate was from 0.95–1.00 g./cm.$^3$.

Suppose a density range of 0.9 to 0.95 g./cm.$^3$ is to be supervised, plate 5 has to be exchanged so that now the basic pulse rate of 3200 pulses/sec. will be present at a density of 0.95 g./cm.$^3$. One knows that at a liquid of 0.95 g./cm.$^3$ the absorbtion in the rest of the apparatus and the liquid is $3900e^{+\mu 10mm}$. The thickness for a new plate 5 can then be calculated from the condition that the same absorbtion is equal to:

$$3200e^{+\mu e}=3900e^{+\mu 10mm.}$$

One can find the new $e$ value plate 5 which, when inserted into the apparatus again produces the basic value 32000 pulses/sec. at a density of 0.95 g./cm.$^3$. In such a manner one can easily find a number of thickness values for plates 5 which will cover a large density scale range. Since one has only available limited space for plate 5, it might be advisable to change the material for low liquid densities. Low liquid densities require thicker plates 5 so as to balance the detector towards basic value 3200 pulses/sec.

Another way of providing a set of plates for plates 5 is to have premanufactured plates of regularly decreasing thickness, and since for the preparation of the device for later calibration and later use one is not bound or limited as to the means employed, one then can calculate and/or measure the density range covered by each plate taking again the range of 3200–3900 pulses/sec. as basic range.

It was found that the following plates can be associated with the following density ranges.

| Plates 5 (mm.): | Density range g./cm.$^3$ |
|---|---|
| Stainless steel 10 | 0.95–1.00 |
| Stainless steel 14 | 0.910–0.956 |
| Stainless steel 18 | 0.869–0.914 |
| Lead 11 | 0.83–0.874 |
| Lead 12 | 0.791–0.834 |

To each plate, the density range corresponds to a scale range in instrument 16 extending from zero to maximum, or from 0 to 100% scale range. FIG. 2 illustrates this aspect comparing calculated ranges with truly measured ranges for a water-alcohol mixture.

In case one wishes to employ instrument 16 to cover a density-variation range of 100 g./1tr. instead of 50 g./1tr. as previously described, plate 12a, has to be exchanged. It was found that with 3200 pulses/sec. again as basic value, the upper pulse limit for this larger density variation range is 4300 pulses/sec. A corresponding plate 12a of 6.4 mm. when inserted readies the calibrator for calibration of the measuring device so as to cover 100 g.1tr. With plate 5—10 mm., then there would be calibration to the range of 0.9–1.0 g./cm.³. FIG. 3 illustrates calibration curves for about 100 g./1tr. density variation at two different absorber plates 5.

It will be appreciated that all numerical values given above do not constitute critical values but serve only to describe a specific example. It will also be appreciated that the specific mode of obtaining the various values for plates 5, 12 and 12a are not per se decisive for the calibration itself; nevertheless, it will be apparent that the preparation and adaptation of the plates 5, 12 and 12a is rather simple and easy and that they are best made specifically for a given i.e. already existing measuring apparatus. The plates then constitute the only auxiliaries for the actual calibration.

The invention is not limited to the embodiments described above but all changes and modifications thereof not constituting departments from the spirit and scope of the invention are intended to be covered by the following claims.

What I claim is:

1. Calibrator for density measuring apparatus using gamma rays, comprising: a container having a bore and a cylindrical cavity having its axis perpendicular to the extension of said bore; a lead capsule in said cavity; a centrally affixed gamma ray source in said capsule; two oppositely directed windows in said capsule communicating with said source and being individually alignable with said bore; and means at said windows for receiving gamma ray absorption plates.

2. In a liquid density measuring device having a gamma ray source, a liquid container, and a radiation detector including a scintillation crystal disposed adjacent the liquid container, the combination comprising: an opaque container for said crystal and having a sidewardly protruding casing; a bore in said casing directed toward said crystal but out of the radiation range of said gamma ray source; means in said casing defining a cylindrical cavity having its axis perpendicular to the extension of said bore; a lead capsule in said cavity; a centrally affixed calibrator gamma ray source in said capsule; two oppositely directed windows communicating with said calibrator source and being individually alignable with said bore; and means at said windows for receiving absorption plates.

3. In a liquid density measuring device having a gamma ray source, a liquid container, and a radiation detector including a scintillation crystal disposed adjacent the liquid container, the combination comprising: means including a first absorption plate of predetermined thickness disposed in the path extending from said gamma ray source to said scintillation crystal; a second gamma ray source shielded from said first source; and means including a first calibrator plate and a second calibrator plate, said first and second calibrator plate being different from the thickness of said first absorption plate, said first and second calibrator plate being in the ray path extending from said second source to said crystal.

4. A liquid density measuring apparatus comprising: a liquid container; a first gamma ray source positioned so that the gamma ray may pass through the liquid in said container; a scintillation crystal positioned to be responsive to gamma rays having passed through said liquid; light-tight means for closing off said crystal including a gamma ray window; a casing having a bore terminating at said window; a rotatable cylinder in said casing and having two windows individually alignable with said bore; means for receiving and positioning absorption and calibrator plates across said windows; and a second gamma ray source communicating with said two windows.

References Cited by the Examiner
UNITED STATES PATENTS

| 2,540,261 | 2/51  | Herzog  | 250—83   |
| 2,669,662 | 2/54  | Tundahl | 250—83.3 |
| 2,722,609 | 11/55 | Morgan  | 250—43.5 |
| 2,759,108 | 8/56  | Malins  | 250—83.6 |
| 2,936,374 | 5/60  | Zimmer  | 250—83.6 |

RALPH G. NILSON, *Primary Examiner.*
JAMES W. LAWRENCE, *Examiner.*